OVERLOAD CONTROL SYSTEM FOR TRANSISTOR AMPLIFIERS

Original Filed May 27, 1957 3 Sheets-Sheet 1

INVENTOR.
NORMAN J. JOHNSTONE
BY
[signature]
ATTORNEY

Aug. 27, 1963 N. J. JOHNSTONE 3,102,241

OVERLOAD CONTROL SYSTEM FOR TRANSISTOR AMPLIFIERS

Original Filed May 27, 1957 3 Sheets-Sheet 2

SIGNAL WAVE FORMS AT VARIOUS LOCATIONS IN THE CONTROL SYSTEM

INVENTOR.
NORMAN J. JOHNSTONE
BY
F. L. Styner
ATTORNEY

United States Patent Office 3,102,241
Patented Aug. 27, 1963

3,102,241
OVERLOAD CONTROL SYSTEM FOR TRANSISTOR AMPLIFIERS

Norman J. Johnstone, Rochester, N.Y., assignor to General Dynamics Corporation, Rochester, N.Y., a corporation of Delaware Continuation of application Ser. No. 661,777, May 27, 1957. This application Jan. 21, 1960, Ser. No. 4,166
11 Claims. (Cl. 330—22)

This application is a continuation of the copending application filed May 27, 1957, Serial No. 661,777, entitled "Overload Control System for Amplifiers," and assigned to the assignee of this application, and now abandoned.

This invention relates to overload protection systems for amplifiers. Many amplifiers operating at or near rated load are quite vulnerable to burn-out caused by overload, momentary short circuits in the load circuit of transistors often causing complete destruction within one excursion of the signal voltage. The usual fuse, mechanical circuit breaker, or the like, is too slow to protect such amplifiers. The usual automatic gain control circuits, comprising integrating means for averaging signal levels, also are too slow to protect transistor-type amplifiers. The heat dissipating capacity of the junction-type transistor is particularly small and any protecting circuit must function instantaneously. Further, overload protecting systems usually respond to abnormal current, I, through the load or to abnormal voltage, E, across the load rather than to the combined effects of I and E.

An object of this invention is to provide an improved overload protecting circuit for amplifiers.

A more specific object of this invention is to provide a protecting circuit which is responsive to the combined effects of current through and voltages across the amplifier to be protected.

A still more specific object of this invention is to provide an improved protecting circuit for burn-out vulnerable transistors.

A still more specific object of this invention is to provide a transistor protecting circuit which functions instantaneously upon overload.

The objects of this invention are attained by sampling the signal current through the amplifier and the signal voltage across the output circuit of the amplifier to derive a cyclic voltage which is a function of the combined values of the sampled current and voltage. In one embodiment, the combined values are analogous to the power dissipated in the amplifier and is employed to regulate the signal driving voltage. According to an important feature of the invention, the protecting circuits respond instantaneously to cyclic signal voltage to protect the transistor-type amplifier having low heat dissipating capacity.

Other objects and features of the invention will become apparent to those skilled in the art by referring to the following specification of preferred embodiments, shown in the accompanying drawings, in which.

Figure 1:
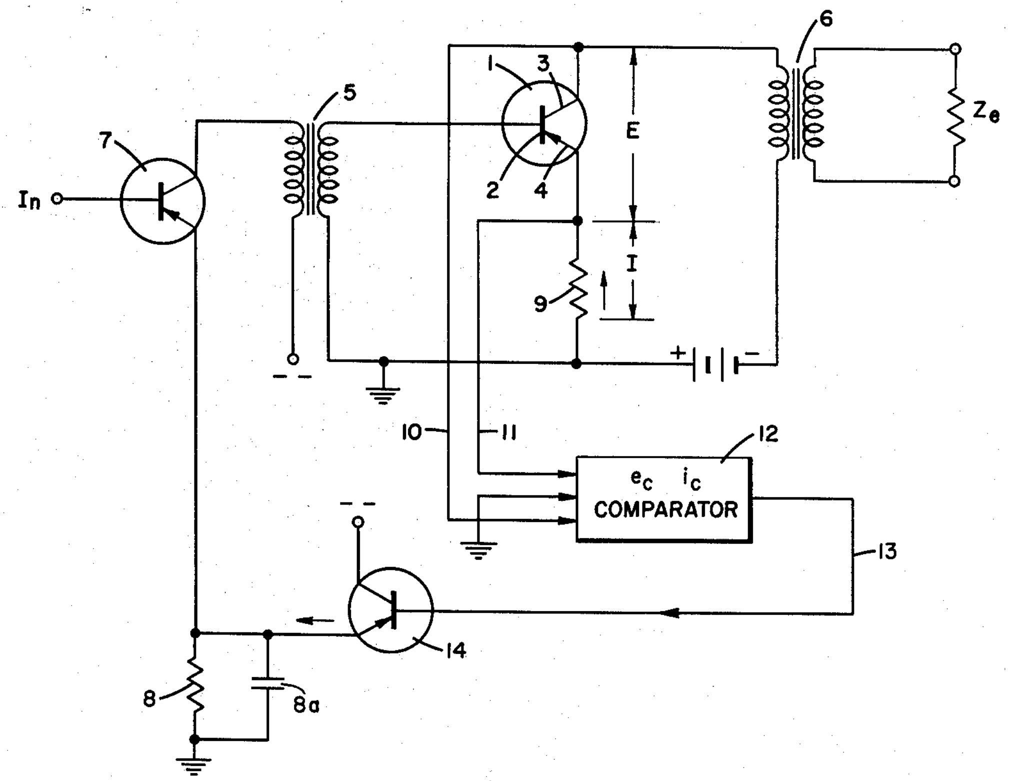
FIG. 1 is a blocked circuit diagram of one amplifier embodying this invention.

The amplifier to be protected, shown in FIG. 1, is the transistor 1, with base 2, collector 3, and emitter 4. The particular connections shown are of the common-emitter type, with the base and emitter connected across the secondary of a signal coupling transformer 5, and with the output electrodes, including the collector and emitter, connected across the primary of the output transformer 6. The common-base or common-collector connections could be used, if desired.

The driver for amplifier 1 may, if desired, comprise another transistor 7, the gain of which may be regulated by the biasing resistor 8 in the emitter circuit thereof. A grid controlled thermionic amplifier could be substituted for the driver 7.

Figure 2:
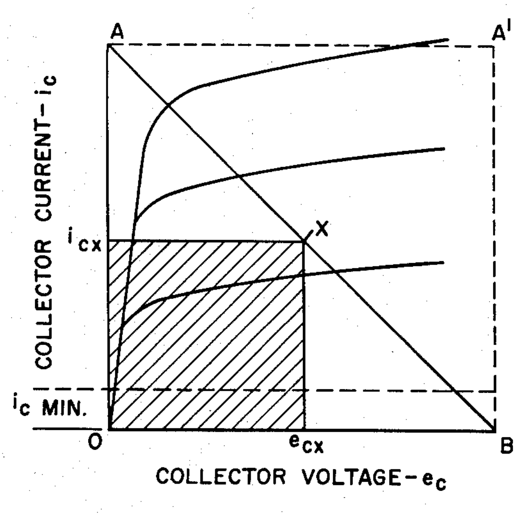
FIG. 2 shows the load characteristics of the amplifier of FIG. 1.

In FIG. 2 is shown the load characteristics of a typical transistor amplifier. By plotting collector voltage, $e_c$, against collector current, $i_c$, a family of curves may be obtained for various base biasing currents. The usual load line A—B is obtained by plotting points A and B, respectively, for maximum and minimum collector currents encountered in operation with normal load. The normal instantaneous dissipation of power in the amplifier is the shaded rectangular area defined by voltage $e_{cx}$ and collector current $i_{cx}$, subscript X denoting any point along the load line A—B. In normal operation, point X moves back and forth along line A—B at signal frequency. If, however, the load on the transistor 1 is increased, as by a decrease in impedance $Z_e$ which in the limit condition is short-circuited, the load line A—B is shifted to line $A^1$—B, substantially perpendicular to the collector voltage ordinate. It will be noted now that with a short-circuited load condition the maximum energy to be dissipated in the amplifier is substantially four times normal maximum dissipation. If the amplifier is a commercial junction transistor, there is little heat-sink capacity and the transistor can be instantaneously destroyed by the overload.

Accordingly, it is an important feature of this invention to provide means for sensing abnormal power dissipated in the amplifier. That is, signal current, I, through the amplifier and signal voltage, E, across the amplifier are sampled and a voltage proportional to a function of the instantaneous combined values of I and E is fed back to the driver. As will appear, the objects of this invention are attained by circuits wherein information fed back to the driver for protecting the amplifier is representative of the instantaneous product, $I \cdot E$, or the instantaneous sum, $I+E$, of the two sampled cyclic voltages.

The collector, or output, current is conveniently sampled according to this invention by inserting the resistor 9 in the output circuit. While the resistor may be located any place in the output circuit, it is preferred that the resistor be connected immediately adjacent to the emitter. The voltage drop across resistor 9 is proportional to the output signal current and is analogous to $i_c$. The ohmic value of the resistor 9 need be but a negligible proportion of the total series resistance of the emitter circuit and should have ample current carrying capacity. The voltage sampling circuit across resistance 9, including lead 11, is conveniently completed by grounding one end of the resistor as shown.

The voltage across the transisor, on the other hand, is conveniently derived between the collector and ground by lead 10. Lead 10, accordingly, samples the collector voltage, $e_c$, and the lead 11 directly samples the collector current, $i_c$. The two voltages are combined in the comparator 12 to produce at its output 13 a voltage proportional, in the particular embodiment shown in FIG. 1, to $e_c \times i_c$. For example, the variable gain multigrid vacuum tube multiplier disclosed on page 253 of "Electronic Analog Computers" by Korn and Korn, 2d edition, McGraw-Hill, 1956, may be used, if desired.

The product voltage at the output of the multiplier is fed back to the driver 7 via line 13. The feedback information on line 13 is preferably amplified, as shown in FIG. 1, by connecting line 13 to the base of transistor 14. Conveniently, the biasing resistor 8 for the emitter circuit of driver 7 is included in the emitter circuit of amplifier 14 and is so proportioned that the negative feedback signal on the line 13 and base of transistor 14 can properly control the gain of driver 7 should the power dissipated in transistor 1 exceed a predetermined amount. It may be found necessary to bypass the biasing resistor with a conventional bypass condenser 8*a* to prevent excessive attenuation of the A.C. signal voltage applied to the input of driver 7. It is contemplated that the parameters of the feedback circuits be so chosen that when load $Z_e$ is short-circuited, the collector current of the protected amplifier be limited to some low value such as $i_{cmin}$, FIG. 2, for full collector voltage. It is further contemplated that the time constants of the multiplier and feedback circuits be sufficiently low that the voltage indicating overload can instantly be applied to the driver 7.

During normal operation, the transistor 14 is cut off by a slightly positive base with respect to the emitter, so that the emitter current is negligible. During abnormal operation, as when the load on transistor 1 is short circuited, the transistor 14 becomes conducting by a negative-going signal pulse and the emitter current becomes suddenly relatively high. With the P-N-P type transistor as shown, the negative signal voltage on line 13 is converted to a low impedance source and is effectively connected to the emitters of both transistors 14 and 7 through the low resistance of transistor 14 the instant the base voltage goes negative in response to an alarm signal on line 13. The negative potential on the emitter of transistor 7 cuts off that transistor and immediately interrupts the application of signal voltages to the transistor 1.

Figure 3:
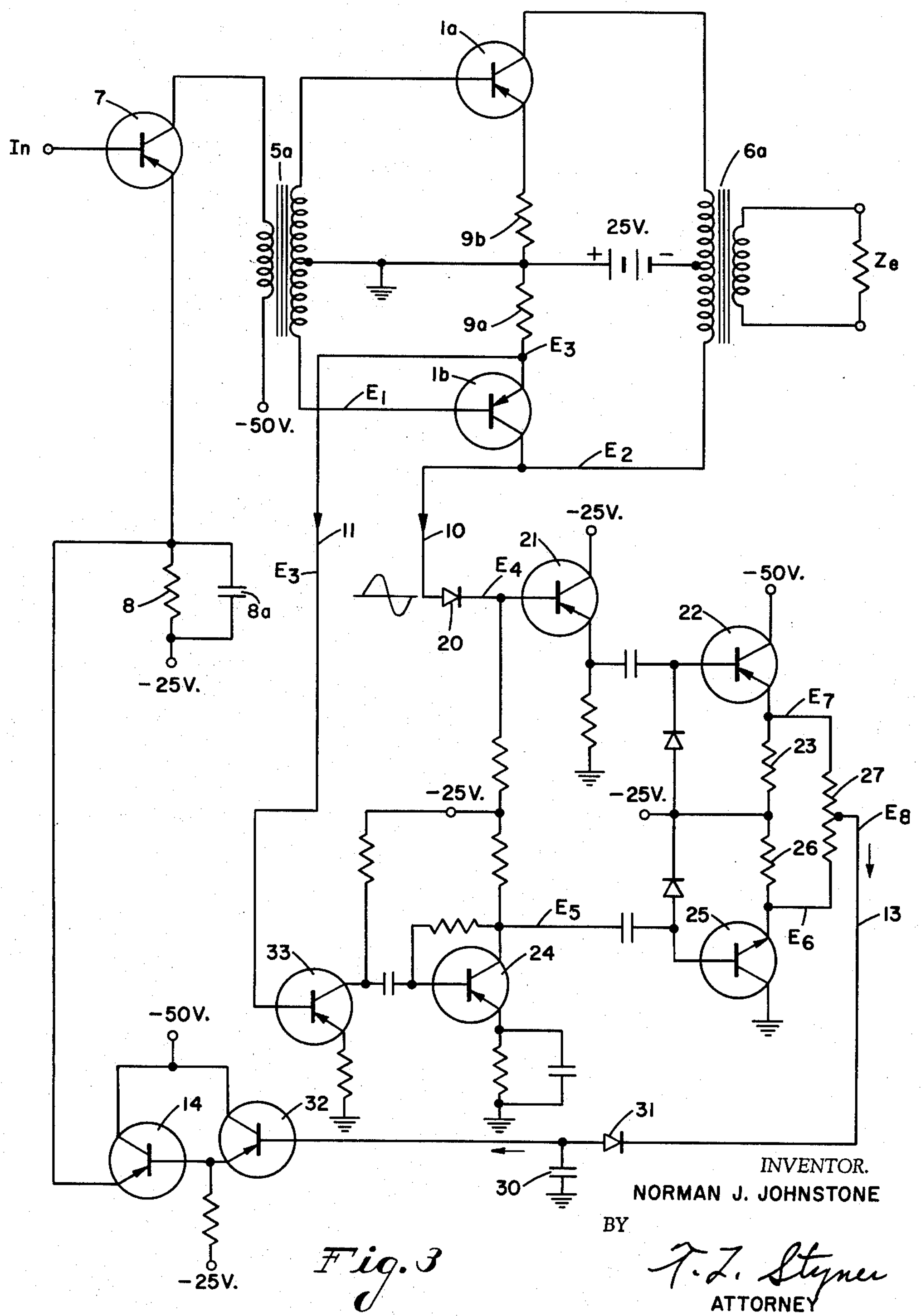
FIG. 3 is a detailed circuit diagram of a practical operative amplifier embodying this invention.

In FIG. 3, the amplifier to be protected is a push-pull Class B arrangement comprising transistors 1*a* and 1*b* connected in balanced relation between output transformer 6*a* and input transformer 5*a*. FIG. 3 is characterized also by means for obtaining a feedback voltage which is a function of the two sampled cyclic signal voltages. In FIG. 3, the instantaneous voltage fed back to the driver 7 is derived by adding the two sample voltages. Inasmuch as it is desired to only sense dangerous overloads on the transistor to be protected, it is actually unnecessary to derive the product of the sampled voltages throughout their normal operating range. Instead, it is merely necessary to have a feedback circuit so constructed that if the product exceeds a certain value then the protecting circuit will sense this value. Since the transistor is a constant current device, the collector current is essentially independent of the collector voltage. Therefore, the collector current and, hence, the voltage $E_3$, FIG. 3, is essentially constant. For practical purposes then, the dangerous overload condition can be sensed by additively comparing $E_2$ with $E_3$. As will appear, the addition of these two voltages simply and reliably derives a voltage which will instantly cut off the driver 7 when an abnormal load condition arises.

Specifically, current sampling resistor 9*a* and complementing resistor 9*b* are connected in the emitter circuits in FIG. 3. The voltages proportional to collector voltage and collector current are obtained, respectively, at the collector and at the emitter of 1*b*, as in the case of FIG. 1.

The voltage $E_2$ at the collector junction includes the D.C. voltage of the battery shown as well as the signal voltage. The phase of the signal voltage at $E_2$ is opposite to the phase of the signal voltage at the base, as usual. The base and emitter voltages are, of course, in phase although the emitter is half-wave rectified. The collector voltage is applied to cascaded transistors 21 and 22 through lead 10 and the half-wave rectifier 20. After amplification by transistors 21 and 22, the signal voltage is obtained across the emitter resistor 23.

Now, the voltage $E_3$ produced by transistor current through resistor 9*a* is applied through lead 11 to cascaded amplifiers 33, 24, and 25 and is impressed across the emitter resistor 26. Amplification in the two parallel channels is adjusted and the parameters of the circuits so selected that the signal voltage drop across resistors 23 and 26 are equal and opposite in normal operation. That is, as point X in FIG. 2 moves along load line A—B with normal load $Z_e$, the electrical center of resistors 23—26 remains fixed. Accordingly, the center of resistor 27, which is in parallel with resistors 23 and 26 as shown, does not change in normal operation of amplifier 1*a*—1*b*, and there is no feedback over line 13. Where the transistors 22 and 25 are in series and are of the junction germanium P-N-P and N-P-N type, respectively, the collectors are operated at a negative and positive voltage, respectively, with respect to the emitters as shown. In the specific example shown, accordingly, the center point of potentiometer 27 stands at some stable level between ground and the negative collector voltage of 22. In the example shown, with the collector voltages indicated, the mid point of potentiometer 27 normally stands at −25 volts.

An intermediate point on potentiometer 27 is coupled back to the emitter of driver 7. It has been found desirable, in the particular embodiment of FIG. 3, to amplify the feedback current in two cascaded amplifiers 14 and 32. Amplifiers 14 and 32 are also of the P-N-P type with the collectors connected to a higher negative voltage than the emitters, as shown. To prevent signal feedback and self-sustained oscillations or ringing in the system of FIG. 3, the bypass condenser 30 in conjunction with the reverse resistance of diode 31 forms an effective filter to eliminate the possibility of positive feedback, should $E_7$ become larger in amplitude than $E_6$ for some reason, such as, an open circuited load. Obviously, positive feedback could cause oscillations and ringing which might damage the transistor which is to be protected. It is desirable also to so back bias the rectifier 31 as to prevent negative-going signals below a predetermined amplitude from being fed back to the driver. That is, a substantial negative-going signal at $E_8$, which occurs only when abnormal or high-load operating conditions occur in the output of amplifiers 1*a* and 1*b*, is required to overcome the back bias of rectifier 31. In the embodiment of FIG. 3 with the transistor voltages indicated, the cathode electrode of rectifier 31 is biased by line 13 to −25 volts, while the anode electrode is biased to some voltage between −25 and −50 volts. If the anode bias is, say, −37½ volts, the back bias is then 12½ volts and the $E_8$ voltage must swing to −37½ volts before current can start through the rectifier 31. When current does start through the rectifier 31, the resistance of rectifier 31 drops from some high or near infinite value to near zero value. The negative-going signal passed by the rectifier immediately drives the base of transistor 32 in a negative direction which in turn unblocks or increases the emitter current of transistor 32. The resulting negative signal on the base of transistor 14 increases the emitter current of transistor 14, increases the voltage drop through resistor 8, and hence reduces the emitter current of transistor-driver 7. The voltage drop through resistor 8 can be adjusted, by suitable selection of circuit parameters, to cut off driver 7 when the first minimum signal passes rectifier 31.

In operation, when the load impedance $Z_e$ decreases, the peak-to-peak A.C. voltage across the transistor 1*b* decreases. Assume load impedance $Z_e$ drops to zero, as by a short circuit. This means there can be no signal voltage developed across the primary of transformer 6*a*. If there is no signal voltage developed across the primary, only the voltage of the biasing battery, which is 25 volts in the example of FIG. 3, is applied across the transistor 1*b* during the time the short circuit is present. This means that no signal voltage $E_2$ can be applied to the base of transistor 21 nor transistor 22. However, the signal voltage $E_3$ is applied to the base of transistor 33 because the signal in the base and on the emitter of 1*a* and 1*b* is still present. This causes an unbalance in the signal voltage waves across resistors 23 and 26, which results in a net and instantaneous change in the voltage $E_8$. As stated, when the new voltage in the feedback line 13 is sufficient, there is an increased instantaneous bias current through resistor 8 cutting the gain of driver 7 to zero or some new safe value. When the overload at $Z_e$ is removed, the driver operation returns to normal.

Figure 4:
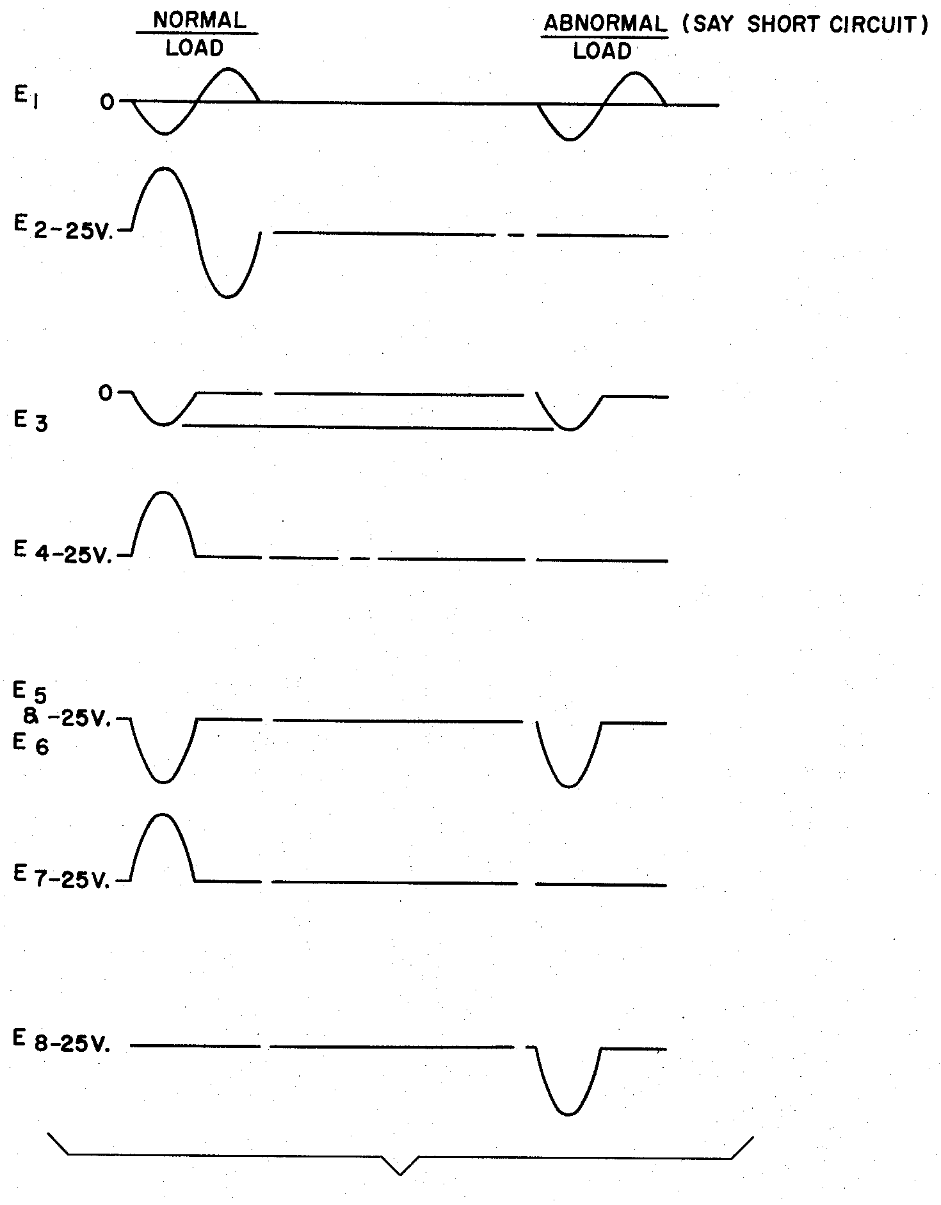
FIG. 4 shows a family of voltage waves at strategic points in the system of FIG. 3.

The family of curves of FIG. 4 have been added to show cyclic signal waveforms at strategic points throughout the system of FIG. 3 for both normal and abnormal load at $Z_e$. The voltage values applied to the waveforms of FIG. 4 are the approximate signal voltages when the battery voltages of FIG. 3 are employed. The full-wave signal voltage $E_1$ on the base of **1*b* is inverted in phase on the collector of that transistor. The collector signal voltage $E_2$ is full-wave as shown by virtue of the push-pull operation and the mutual coupling between the windings on either side of the center tap of transformer 6*a*. The voltages $E_3$ and $E_2$ on the emitter and on the collector are phase opposed as shown in FIG. 4. The positive loops of the signal wave at the emitter are eliminated as shown because as the base of 1*b* goes positive the transistor is cut-off making it impossible for the emitter to follow. The negative loops of the signal wave of $E_2$ are eliminated by rectifier 20 to produce the half-wave of $E_4$, as shown, so that it may be adjusted in amplitude and compared to $E_3$. Voltages $E_5$ and $E_6$, which are amplified undistorted replicas of signal voltage $E_3$, are in phase inasmuch as transistor 29 is of the N-P-N type as distinguished from the P-N-P type employed elsewhere in the system. Now, since $E_6$ and $E_7$ at opposite ends of potentiometer 27 are opposed and are adjusted to be equal, the voltage $E_8$ remains steady. It is significant that the half-wave signal voltages $E_6$ and $E_7$ at opposite ends of potentiometer 27** are substantially undistorted replicas of the original signals $E_3$ and $E_4$ adjacent in amplitude, so that any instant of time their sum is zero.

Now, when the abnormal load is applied, the signal component at the collector of transistor **1*b* disappears and there remains only the steady reference voltage $E_2$. Thereupon $E_4$ becomes stetady, and $E_7$ becomes steady. In the meantime, voltages $E_3$, $E_5$, and $E_6$ follow the pattern of the signal wave. The steady voltage $E_7$ added to the voltage $E_6$, results in the negative-going feedback voltage $E_8$ in line 13, and the protective action in the biasing resistor 8**.

It now becomes apparent that the type of amplifiers to be used in the system of this invention are not limited to the specific amplifiers illustrated. Further, the sampling circuits generally designated at 10, 11, and 12, in FIGS. 1 and 3, may assume many configurations without departing from the scope of this invention.

What is claimed is:

1. In an overload protecting system for transistors, a transistor to be protected, an amplifier for cyclic signal voltages driving said transistor, a signal voltage sampling circuit connected across the output electrodes of said transistor for obtaining a sample of the cyclic signal voltage, the sampled signal voltage being proportional to the impedance drop through the load circuit of said transistor caused by transistor output signal current, a signal current sampling circuit in series with said output electrodes for producing a signal proportional to the signal current through said transistor, means for instant-by-instant comparing the sampled cyclic voltages and for producing an output voltage only when the compared voltages are dissimilar and means responsive to said output voltage of the comparing means for attenuating the signal driving voltage applied to said transistor.

2. In combination, a transistor signal amplifier including a transistor with an input circuit and an output circuit coupled, respectively, to a driving circuit and to a load circuit, said driving circuit having a cyclic signal voltage source and a gain control circuit, a resistor of relatively small ohmic value in said output circuit; terminals connected to two output electrodes of said transistor, separate means for separately amplifying the cyclic signal voltages at each of said terminals without integration, a potentiometer, means for applying the amplified signal voltages, respectively, to the terminals of said potentiometer for continuously algebraically adding the instantaneous cyclic values of the two amplified signal voltages, and a coupling circuit connected between an intermediate point on said potentiometer and said gain control circuit of said driver for applying to said gain control circuit a cyclic signal voltage the instantaneous amplitude of which is a function of the sum of the two cyclic signal voltages added in said potentiometer.

3. In combination, a transistor amplifier connected between a load circuit and a driver circuit, said driver circuit having a biasing circuit, means for respectively sampling the signal current through and the signal voltage across said transistor, means for comparing the instantaneous values of said two signals, and a feedback circuit between the comparing means and the bias circuit of said driver for applying the instantaneous values of combined signal voltages to said biasing circuit.

4. The feedback circuit recited in claim 3 comprising a rectifier serially connected in said feedback circuit to permit application of instantaneous signal voltages of only one polarity to said biasing circuit, and a bypass condenser connected across said feedback circuit between said rectifier and said biasing circuit for preventing oscillation-producing feedback.

5. In combination, a transistor amplifier having output electrodes coupled in a load circuit and having control electrodes coupled to an alternating current driver circuit, said driver circuit having a biasing circuit; means coupled to the output electrodes for, respectively, sampling as signal voltages the alternating current through and the alternating voltage across said transistor, means for separately amplifying said two alternating signal voltages, means for algebraically adding the instantaneous cyclic phase-opposed values of said two signal voltages, and a feedback circuit coupled between the adding means and the biasing circuit of said driver for applying the instantaneous cyclic values of added signal voltages to said biasing circuit.

6. The invention as set forth in claim 5 wherein a rectifier is serially connected in said feedback circuit to permit application of instantaneous cyclic signal voltages of only one polarity to said biasing circuit, and a bypass condenser is connected across said feedback circuit between said rectifier and said biasing circuit.

7. In an overload protecting system for transistors, a transistor to be protected, said transistor having input electrodes and output electrodes, a signal amplifier for driving said transistor with a cyclic signal voltage, a signal voltage sampling circuit coupled to the output electrodes of said transistor for producing a cyclic signal voltage proportional in amplitude to the resistance drop through said transistor caused by transistor output current; a signal current sampling circuit, directly in series with said output electrodes, for producing a cyclic signal voltage proportional to signal current through said transistor; means for comparing the instantaneous values of the sampled voltages, said means comprising a resistor with end terminals and a mid-tap, connections for applying in phase opposition said sampled voltages, respectively, to said end terminals, means for adjusting the amplitudes of the phase-opposed signal voltages at the end terminals so that the mid-tap voltage remains substantially fixed during normal operation of said transistor, and coupling means between said mid-tap and said signal amplifier for instantaneously reducing the amplitude of signals applied to said transistor during abnormal operation of said transistor.

8. In an overload protecting system for transistors, a transistor to be protected, said transistor having input electrodes and output electrodes, a cyclic signal amplifier driving said transistor, a voltage sampling circuit coupled across the output electrodes of said transistor for producing a cyclic signal voltage proportional in amplitude to the drop through the load circuit of said transistor caused by transistor output signal current; a signal current sampling circuit, directly in series with said output electrodes, for producing a cyclic voltage proportional to signal current through said transistor; means for combining in phase opposition the instantaneous values of said cyclic voltages to produce a cyclic signal, and coupling means between said combining means and said signal amplifier for instantaneously reducing the amplitude of signals applied to said transistor during abnormal excursions of signal current through said transistor.

9. In combination, a transistor signal amplifier with an input circuit and an output circuit coupled, respectively, to a driving circuit and to a load circuit, said driving circuit having a cyclic signal voltage source and a gain control circuit, a resistor in said output circuit, said resistor having small ohmic value compared to the normal ohmic resistance of said output circuit; terminals connected to the two output electrodes of said transistor, separate means for amplifying the two signal voltages at said terminals, a potentiometer, means for applying the two amplified signal voltages, respectively, to opposite ends of said potentiometer for continuously algebraically adding the instantaneous values of the two amplified cyclic signal voltages, and a coupling between an intermediate point on said potentiometer and said gain control circuit of said driver to apply to said gain control circuit a signal voltage the instantaneous amplitude of which is a function of the sum of the two signal voltages added in said potentiometer.

10. In combination, a transistor with base, emitter, and collector electrodes coupled as an amplifier between an output circuit and a signal driver circuit, said base and emitter electrodes being connected in said driver circuit, and said collector and emitter electrodes being connected in said output circuit, a resistor of small ohmic value compared to the resistance of said output circuit connected to said emitter in said output circuit, means connected directly to the emitter-end of said resistor for sampling the signal voltage across said resistor, means connected directly to said collector for sampling the signal voltage across said output circuit; an adding resistor, coupling means for applying in phase opposition said two sampled signal voltages, respectively, to opposite ends of said adding resistor whereby an intermediate point on said adding resistor is normally of fixed voltage, said point being coupled to said driver circuit to cut-off said driver in response to abnormal load conditions.

11. In combination, a transistor amplifier with a base, a collector, and an emitter, a driver amplifier with a biasing circuit, said driver amplifier being transformer-coupled to said base and emitter, said collector and emitter being transformer-coupled to a load circuit, a resistor in the emitter circuit of said transistor amplifier, an adding resistor, means for applying cyclic signal voltages at said collector in one phase to one end of said adding resistor and means for applying the cyclic signal voltage at said emitter in opposite phase to the other end of said adding resistor for combining the two mentioned signal voltages; and feedback circuit, responsive to the combined voltages at an intermediate point on said resistor, coupled to said biasing circuit of the driver amplifier.

References Cited in the file of this patent

UNITED STATES PATENTS

| | | |
|---|---|---|
| 2,504,699 | Kluender | Apr. 18, 1950 |
| 2,561,049 | Buys | July 17, 1951 |
| 2,672,530 | Ensink | Mar. 15, 1954 |
| 2,760,007 | Lozier | Aug. 21, 1956 |

FOREIGN PATENTS

| | | |
|---|---|---|
| 789,582 | Great Britain | Jan. 22, 1958 |